(12) United States Patent
Xu et al.

(10) Patent No.: US 9,080,403 B2
(45) Date of Patent: *Jul. 14, 2015

(54) TUBULAR ANCHORING SYSTEM AND METHOD

(75) Inventors: YingQing Xu, Tomball, TX (US); Gregory Lee Hern, Porter, TX (US)

(73) Assignee: Baker Hughes Incorporated, Houston, TX (US)

( * ) Notice: Subject to any disclaimer, the term of this patent is extended or adjusted under 35 U.S.C. 154(b) by 638 days.

This patent is subject to a terminal disclaimer.

(21) Appl. No.: 13/358,332

(22) Filed: Jan. 25, 2012

(65) Prior Publication Data

US 2013/0186648 A1   Jul. 25, 2013

(51) Int. Cl.
*E21B 23/01* (2006.01)
*E21B 41/00* (2006.01)

(52) U.S. Cl.
CPC ............. *E21B 23/01* (2013.01); *E21B 41/0064* (2013.01); *Y02C 10/14* (2013.01)

(58) Field of Classification Search
USPC .................. 166/138, 290, 216, 217, 212, 384
See application file for complete search history.

(56) References Cited

U.S. PATENT DOCUMENTS

| 2,189,697 | A | | 2/1940 | Baker |
| 2,222,233 | A | * | 11/1940 | Mize ............................. 166/124 |
| 2,672,199 | A | | 3/1948 | McKenna |
| 2,753,941 | A | | 7/1956 | Hebard et al. |
| 2,933,136 | A | * | 4/1960 | Ayers et al. .................... 166/284 |
| 3,142,338 | A | | 7/1964 | Brown |
| 4,284,137 | A | | 8/1981 | Taylor |
| 4,524,825 | A | | 6/1985 | Fore |
| 4,719,971 | A | | 1/1988 | Owens |
| 4,901,794 | A | * | 2/1990 | Baugh et al. .................. 166/118 |
| 5,511,620 | A | | 4/1996 | Baugh et al. |
| 6,354,372 | B1 | | 3/2002 | Carisella et al. |
| 6,394,180 | B1 | | 5/2002 | Berscheidt et al. |
| 6,446,717 | B1 | | 9/2002 | White et al. |
| 6,513,600 | B2 | | 2/2003 | Ross |
| 6,712,797 | B1 | | 3/2004 | Southern, Jr. |
| 6,769,491 | B2 | | 8/2004 | Zimmerman et al. |
| 7,165,622 | B2 | | 1/2007 | Hirth et al. |
| 7,350,582 | B2 | | 4/2008 | McKeachnie et al. |
| 7,607,476 | B2 | | 10/2009 | Tom et al. |
| 7,743,836 | B2 | | 6/2010 | Cook et al. |
| 7,798,236 | B2 | | 9/2010 | McKeachnie et al. |

(Continued)

OTHER PUBLICATIONS

Quik Drill Composite Frac Plug; Baker Hughes, Baker Oil Tools; Copyright 2002; 3 pages.

(Continued)

*Primary Examiner* — David Andrews
*Assistant Examiner* — Ronald Runyan
(74) *Attorney, Agent, or Firm* — Cantor Colburn LLP

(57) ABSTRACT

A tubular anchoring system includes a frustoconical member having a first frustoconical portion and a second frustoconical portion. The first frustoconical portion is tapered in a direction opposing a direction of taper of the second frustoconical portion and slips in operable communication with the first frustoconical portion are radially expandable in response to longitudinal movement of the first frustoconical portion relative to the slips. A seal in operable communication with the second frustoconical portion is radially expandable in response to longitudinal movement of the second frustoconical portion relative to the seal, and a seat having a surface configured to be sealingly engagable with a plug runnable thereagainst.

18 Claims, 6 Drawing Sheets

(56) References Cited

U.S. PATENT DOCUMENTS

| | | |
|---|---|---|
| 8,459,347 B2 | 6/2013 | Stout |
| 2002/0096365 A1 | 7/2002 | Berscheidt et al. |
| 2003/0226668 A1 | 12/2003 | Zimmerman et al. |
| 2012/0145378 A1 | 6/2012 | Frazier et al. |
| 2012/0234546 A1 | 9/2012 | Xu et al. |
| 2013/0008671 A1 | 1/2013 | Booth et al. |

OTHER PUBLICATIONS

Notification of Transmittal of the International Preliminary Report on Patentability and the Written Opinion of the International Searching Authority, or the Declaration; PCT/US2013/020046; July 29, 2014, 5 pages.

Notification of Transmittal of the International Search Report and the Written Opinion of the International Searching Authority, or the Declaration; PCT/US2014/010862; Apr. 21, 2014; 9 pages.

Notification of Transmittal of the International Search Report on Patentability and the Written Opinion of the International Searching Authority, or the Declaration; PCT/US2013/020046; Apr. 10, 2013, 7 pages.

* cited by examiner

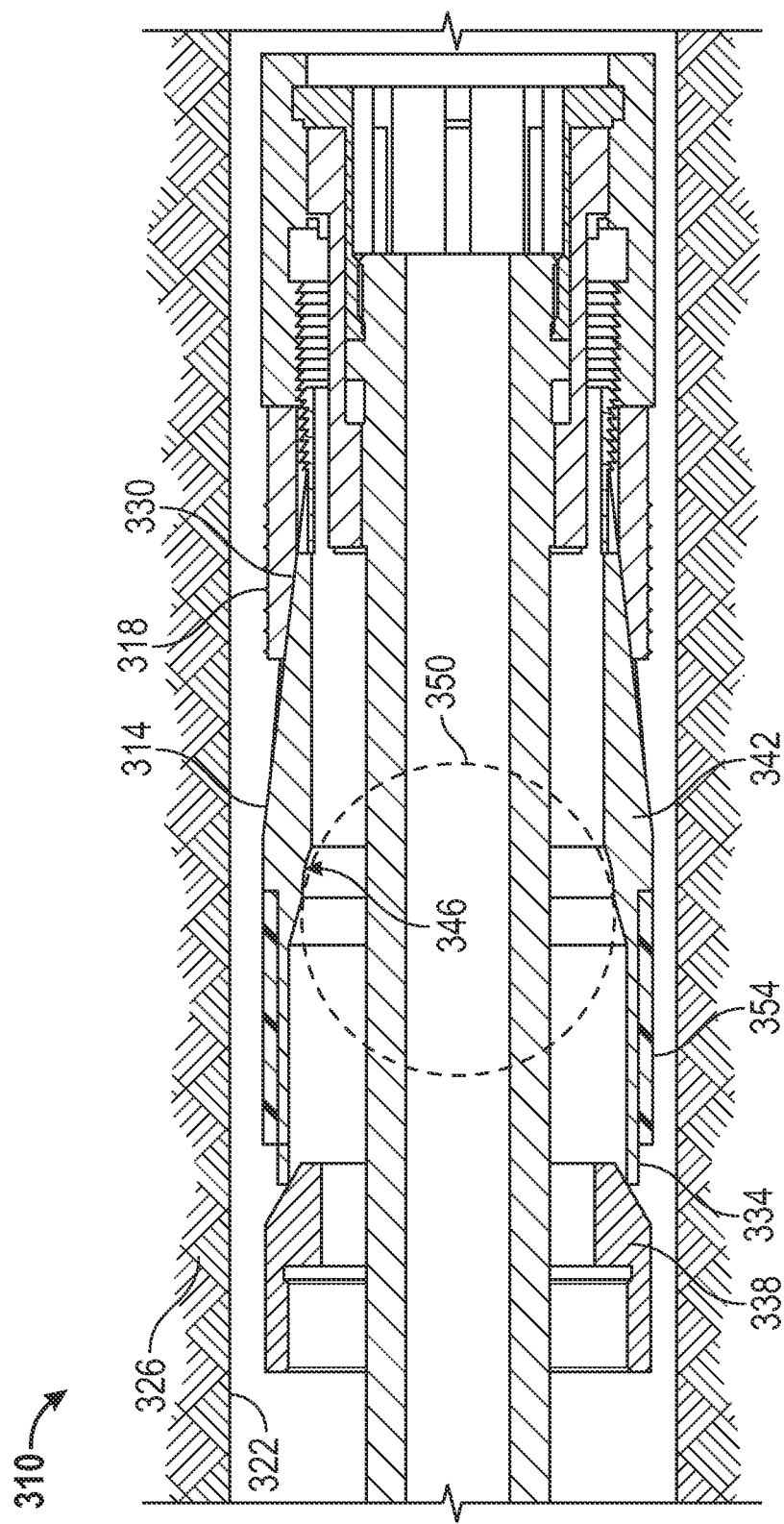

TUBULAR ANCHORING SYSTEM AND METHOD

BACKGROUND

Tubular systems, such as those used in the completion and carbon dioxide sequestration industries often employ anchors to positionally fix one tubular to another tubular. Although existing anchoring systems serve the function for which they are intended, the industry is always receptive to new systems and methods for anchoring tubulars.

BRIEF DESCRIPTION

Disclosed herein is a tubular anchoring system. The system includes a frustoconical member having a first frustoconical portion and a second frustoconical portion. The first frustoconical portion is tapered in a direction opposing a direction of taper of the second frustoconical portion and slips in operable communication with the first frustoconical portion are radially expandable in response to longitudinal movement of the first frustoconical portion relative to the slips. A seal in operable communication with the second frustoconical portion is radially expandable in response to longitudinal movement of the second frustoconical portion relative to the seal, and a seat having a surface configured to be sealingly engagable with a plug runnable thereagainst.

Further disclosed is a method of anchoring a tubular member. The method includes compressing a tubular member positioned within a structure, moving slips in a first longitudinal direction with the compressing, and ramping the slips radially outwardly along a first frustoconical portion of a frustoconical member. The method also includes moving a seal in a second longitudinal direction with the compressing, ramping the seal radially outwardly along a second frustoconical portion of the frustoconical member, sealing the seal to the structure, anchoring the slips to the structure, and seating a plug against a seat.

BRIEF DESCRIPTION OF THE DRAWINGS

The following descriptions should not be considered limiting in any way. With reference to the accompanying drawings, like elements are numbered alike:

FIG. 6 depicts a cross sectional view of yet another alternate tubular anchoring system disclosed herein.

DETAILED DESCRIPTION

A detailed description of one or more embodiments of the disclosed apparatus and method are presented herein by way of exemplification and not limitation with reference to the Figures.

Figure 1:
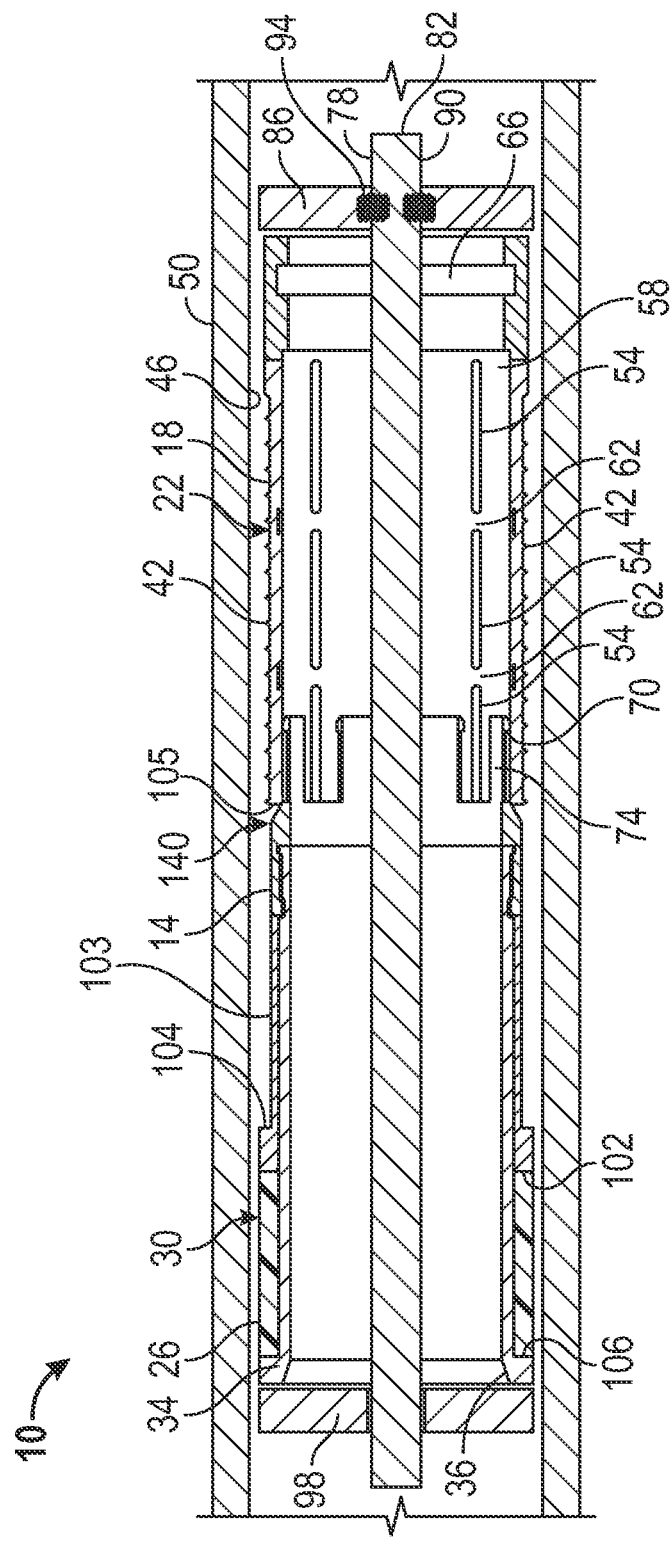
FIG. 1 depicts a cross sectional view of a tubular anchoring system disclosed herein in a non-anchoring position.
Figure 2:
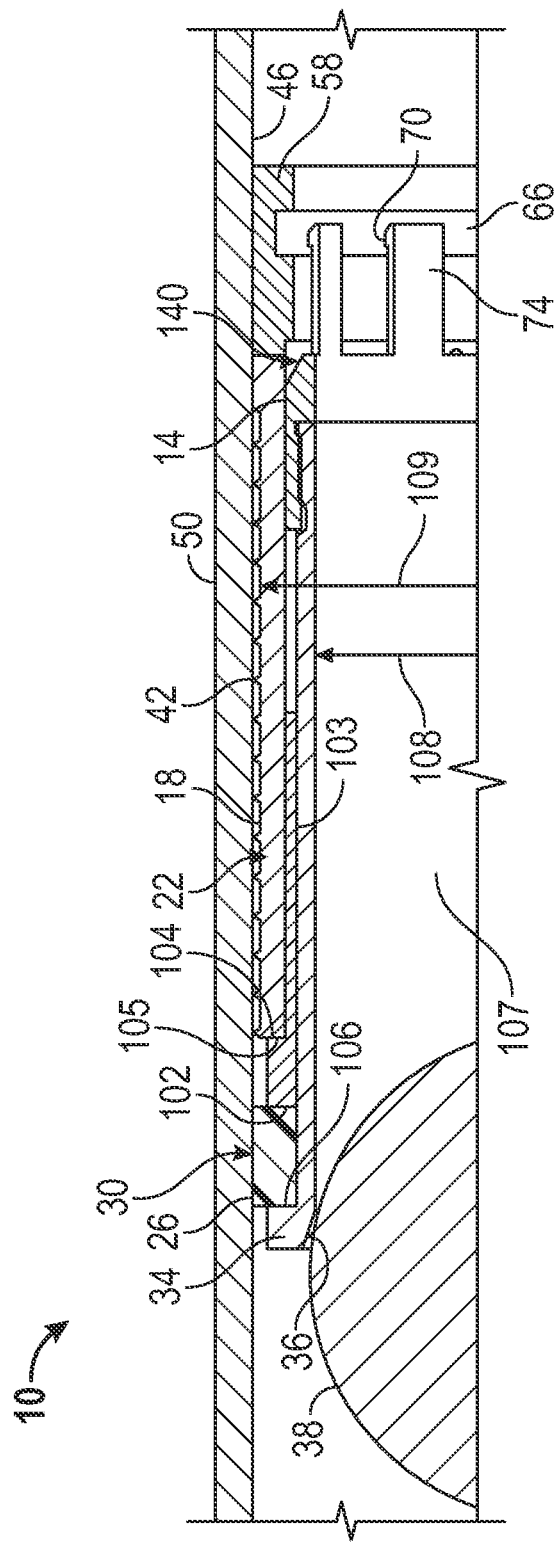
FIG. 2 depicts a cross sectional view of the tubular anchoring system of FIG. 1 in an anchoring position.

Referring to FIGS. 1 and 2, a tubular anchoring system disclosed herein is illustrated at 10. The system 10, among other things includes, a frustoconical member 14, a sleeve 18, shown herein as a slip ring having a surface 22, a seal 26, having a surface 30, and a seat 34. The system is configured such that longitudinal movement of the frustoconical member 14 relative to the sleeve 18 and relative to the seal 26 cause the surfaces 22 and 30 of the sleeve 18 and seal 26 respectively to be radially altered. And, although in this embodiment the radial alterations are in radially outward directions, in alternate embodiments the radial alterations could be in other directions such as radially inward. The seat 34 is connected with the frustoconical member 14 such that movement of the seat 34 also causes movement of the frustoconical member 14. And the seat 34 has a land 36 that is sealingly engagable with a plug 38, shown herein as a ball (in FIG. 2 only), runnable thereagainst. Once the plug 38 is sealingly engaged with the seat 34 pressure can be built upstream thereof to perform work such as fracturing an earth formation or actuating a downhole tool, for example, when employed in a hydrocarbon recovery application.

The surface 22 of the sleeve 18 in this embodiment includes protrusions 42 that may be referred to as teeth, configured to bitingly engage with a wall 46 of a structure 50, within which the system 10 is employable, when the surface 22 is in a radially altered (i.e. expanded) configuration. This biting engagement serves to anchor the system 10 to the structure 50 to prevent relative movement therebetween. Although the structure 50 disclosed in this embodiment is a tubular, such as a liner or casing in a borehole, it could just as well be an open hole in an earth formation, for example.

In the embodiment illustrated in the FIGS. 1 and 2 the sleeve 18 includes a plurality of slots 54 that extend fully through walls 58 thereof that are distributed perimetrically about the sleeve 18 as well as longitudinally along the sleeve 18. The slots 54, in this embodiment, are configured such that a longitudinal dimension of each is greater than a dimension perpendicular to the longitudinal dimension. Webs 62 in the walls 58 extend between pairs of longitudinally adjacent slots 54. The foregoing structure permits the sleeve 18 to be radially altered by the frustoconical member 14 with less force than if the slots 54 did not exist. The webs 62 may be configured to rupture during radial alteration of the sleeve 18 to further facilitate radial alteration thereof.

The sleeve 18 also has a recess 66 formed in the walls 58 that are receptive to shoulders 70 on fingers 74 that are attached to the seat 34. Once the seat 34 has moved sufficiently relative to the sleeve 18 that the shoulders 70 are engaged in the recess 66 the seat 34 is prevented from moving in a reverse direction relative to the sleeve 18, thereby maintaining the frustoconical member 14 longitudinally overlapping with the sleeve 18. This overlapping assures that the radial expansion of the sleeve 18 is maintained even after forces that drove the frustoconical member 14 into the sleeve 14 are withdrawn. Additional embodiments are contemplated for maintaining relative position between the frustoconical member 14 and the sleeve 18 once they have become longitudinally overlapped including frictional engagement between the frustoconical member 14 and the sleeve 18, as well as wickers on one or both of the frustoconical member 14 and the sleeve 18 that engage with a surface of the other, for example.

A setting tool 78 (FIG. 1 only) can generate the loads needed to cause movement of the frustoconical member 14 relative to the sleeve 18. The setting tool 78 can have a mandrel 82 with a stop 86 attached to one end 90 by a force failing member 94 shown herein as a plurality of shear screws. A plate 98 guidingly movable along the mandrel 82 (by means not shown herein) in a direction toward the stop 86 can longitudinally urge the frustoconical member 14 toward the sleeve 18. Loads to fail the force failing member 94 can be set to only occur after the sleeve 18 has been radially altered by the frustoconical member 14 a selected amount. After failure of the force failing member 94 the stop 86 may separate from the mandrel 82 thereby allowing the mandrel 82 and the plate 98 to be retrieved to surface, for example.

Movement of the frustoconical member 14 relative to the sleeve 18 causes the seal 26 to be longitudinally compressed, in this embodiment, between a shoulder 102, on a collar 103 movable with the frustoconical member 14, and a shoulder 106, on the seat 34. This compression is caused by another shoulder 104 on the collar 103 coming in contact with an end 105 of the sleeve 18. This longitudinal compression results in growth in a radial thickness of the seal 26. The frustoconical member 14 being positioned radially inwardly of the seal 26 prevents the seal 26 from reducing in dimension radially. Consequently, the surface 30 of the seal 26 must increase radially. An amount of this increase can be set to cause the surface 30 to contact the walls 46 of the structure 50 (FIG. 2 only) resulting in sealing engagement therewith between. As with the anchoring of the sleeve 18 with the walls 46, the seal 26 is maintained in sealing engagement with the walls 46 by the shoulders 70 of the fingers 74 being engaged with the recess 66 in the sleeve 18

The tubular anchoring system 10 is configured such that the sleeve 18 is anchored (positionally fixed) to the structure 50 prior to the seal 26 sealingly engaging with the structure 50. This is controlled by the fact that the seal 26 is not longitudinally compressed between the end 105 of the sleeve 18 and the shoulder 102 until a significant portion of the sleeve 18 has been radially expanded over the frustoconical member 14 and into anchoring engagement with the structure 50. Positionally anchoring the tubular anchoring system 10 to the structure 50 prior to engaging the seal 26 with the structure has the advantage of preventing relative movement between the seal 26 and the structure 50 after the seal 26 has radially expanded. This sequence prevents damage to the seal 26 that could result if the seal 26 were allowed to move relative to the structure 50 after having been radially expanded. The land 36 of the seat 34 in this embodiment is positioned longitudinally upstream (as defined by fluid flow that urges the plug 38 against the seat 34) of the sleeve 18. Additionally in this embodiment the land 36 is positioned longitudinally upstream of the seal 26. This relative positioning allows forces generated by pressure against the plug 38 seated against the land 36 to further compress the seal 28 into sealing engagement with the structure 50.

The tubular anchoring system 10 is further configured to leave a through bore 107 with a minimum radial dimension 108 that is large in relation to a radial dimension 109 defined by a largest radial dimension of the system 10 when set within the structure 50. In fact the minimum radial dimension 108 is no less than about 70% of the radial dimension 109. Such a large ratio allows the anchoring system 10 to be deployed as a treatment plug, or a frac plug, for example, in a downhole application. In such an application pressure built against the plug 38 seated at the land 36 can be used to frac a formation that the structure is positioned within. Subsequent the fracing operation production through the through bore 107 could commence, after removal of the plug 38 via dissolution or pumping, for example, without the need of drilling or milling any of the components that define the tubular anchoring system 10.

Figure 3:
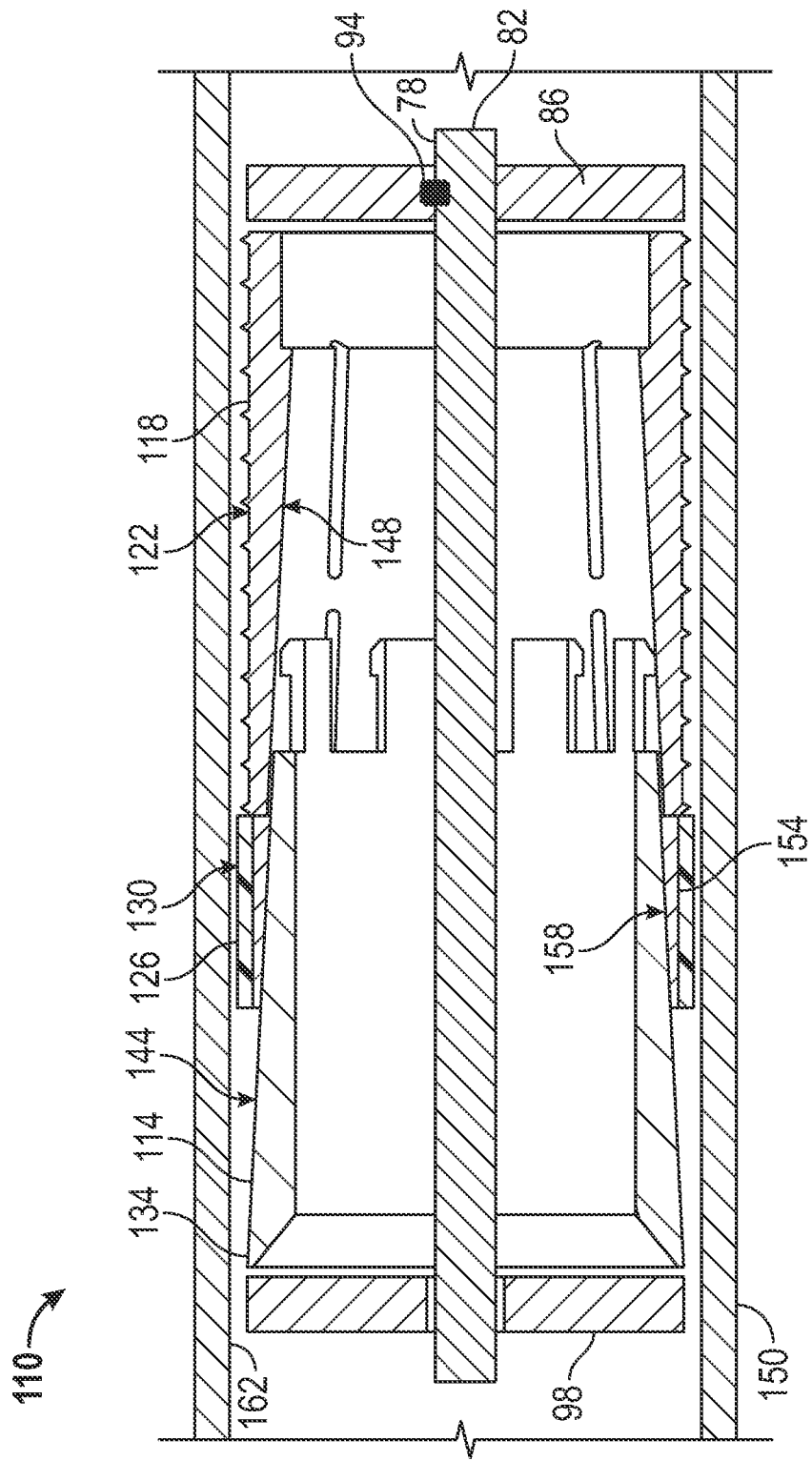
FIG. 3 depicts a cross sectional view of an alternate tubular anchoring system disclosed herein in a non-anchoring position.
Figure 4:
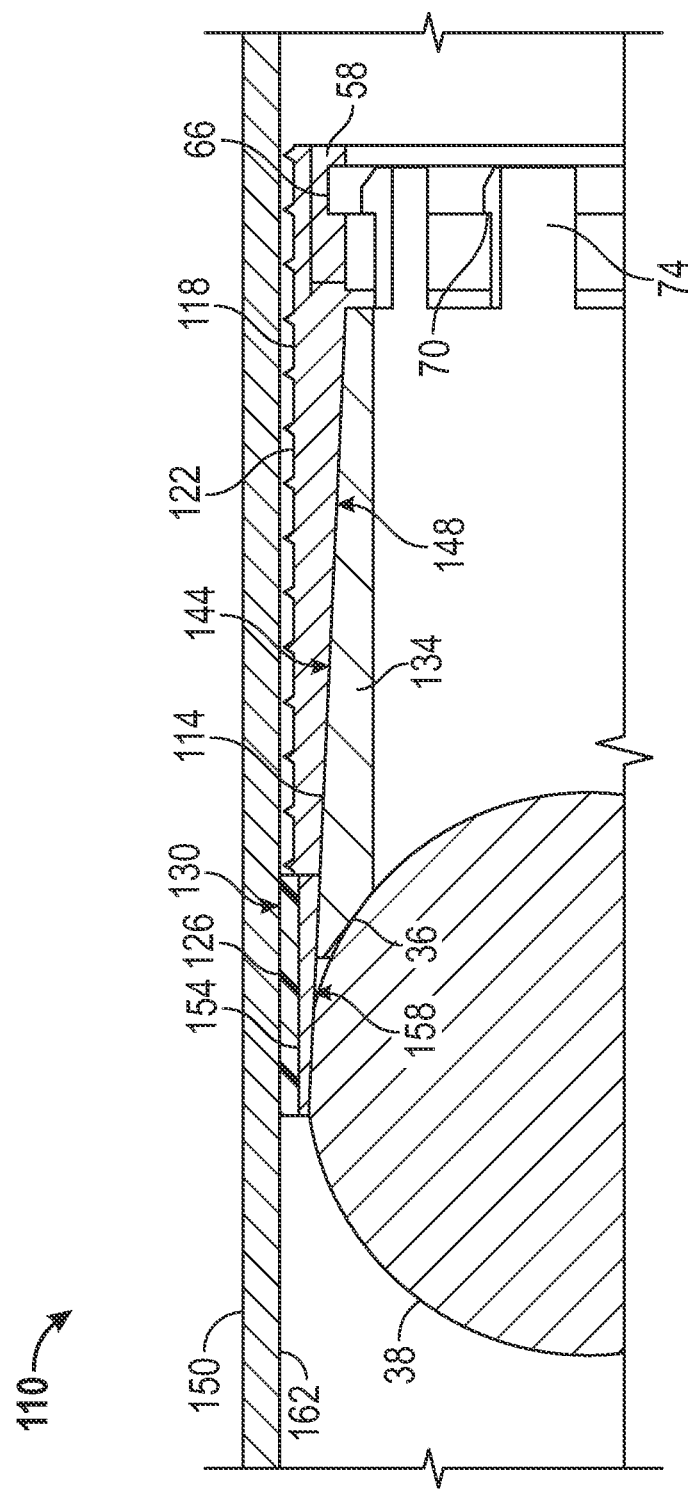
FIG. 4 depicts a cross sectional view of the tubular anchoring system of FIG. 3 in an anchoring position.

Referring to FIGS. 3 and 4, an alternate embodiment of a tubular anchoring system disclosed herein is illustrated at 110. Similar to the system 10 the system 110 includes a frustoconical member 114, a sleeve 118 having a surface 122, a seal 126 having a surface 130 and a seat 134. A primary difference between the system 10 and the system 110 is how the extents of radial alteration of the surfaces 22 and 30 are controlled. In the system 10 an extent of radial alteration of the surface 22 is determined by a radial dimension of a frustoconical surface 140 on the frustoconical member 14. And the extent of radial alteration of the surface 30 is determined by an amount of longitudinal compression that the seal 26 undergoes.

In contrast, an amount of radial alteration that the surface 122 of the sleeve 118 undergoes is controlled by how far the frustoconical member 114 is forced into the sleeve 118. A frustoconical surface 144 on the frustoconical member 114 is wedgably engagable with a frustoconical surface 148 on the sleeve 118. As such, the further the frustoconical member 114 is moved relative to the sleeve 118 the greater the radial alteration of the sleeve 118. Similarly, the seal 126 is positioned radially of the frustoconical surface 144 and is longitudinally fixed relative to the sleeve 118 so the further the frustoconical member 114 moves relative to the sleeve 118 and the seal 126 the greater the radial alteration of the seal 126 and the surface 130. The foregoing structure allows an operator to determine the amount of radial alteration of the surfaces 122, 130 after the system 110 is positioned within a structure 150.

Optionally, the system 110 can include a collar 154 positioned radially between the seal 126 and the frustoconical member 114, such that radial dimensions of the collar 154 are also altered by the frustoconical member 114 in response to the movement relative thereto. The collar 154 can have a frustoconical surface 158 complementary to the frustoconical surface 144 such that substantially the full longitudinal extent of the collar 154 is simultaneously radially altered upon movement of the frustoconical member 114. The collar 154 may be made of a material that undergoes plastic deformation to maintain the seal 126 at an altered radial dimension even if the frustoconical surface 144 is later moved out of engagement with the frustoconical surface 158, thereby maintaining the seal 126 in sealing engagement with a wall 162 of the structure 150.

Other aspects of the system 110 are similar to those of the system 10 including, the land 36 on the seat 126 sealably engagable with the plug 38. And the slots 54 and the webs 62 in the walls 58 of the sleeve 118. As well as the recess 66 in the sleeve 118 receptive to shoulders 70 on the fingers 74. Additionally, the system 110 is settable with the setting tool 78 in a similar manner as the system 10 is settable with the setting tool 78.

Figure 5:
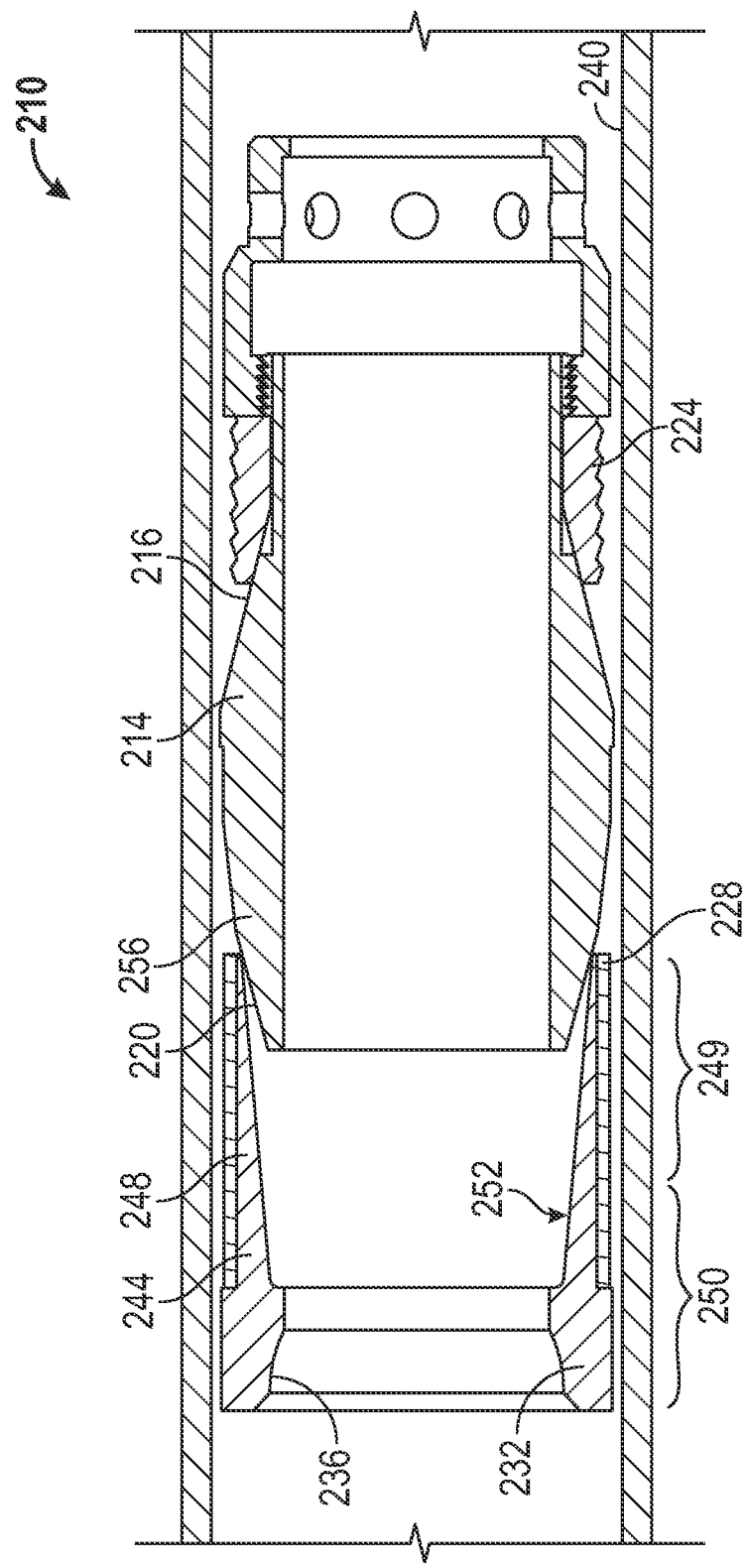
FIG. 5 depicts a cross sectional view of an alternate tubular anchoring system disclose herein.

Referring to FIG. 5 an alternate embodiment of a tubular anchoring system disclosed herein is illustrated at 210. The system 210 includes, a frustoconical member 214 having a first frustoconical portion 216 and a second frustoconical portion 220 that are tapered in opposing longitudinal directions to one another. Slips 224 are radially expandable in response to being moved longitudinally against the first frustoconical portion 216. Similarly, a seal 228 is radially expandable in response to being moved longitudinally against the second frustoconical portion 220. One way of moving the slips 224 and the seal 228 relative to the frustoconical portions 216, 220 is to longitudinally compress the complete assembly with a setting tool that is not shown herein, that could be similar to the setting tool 78. The system 210 also includes a seat 232 with a surface 236 that is tapered in this embodiment and is receptive to a plug (not shown) that can sealingly engage the surface 236.

The tubular anchoring system 210 is configured to seal to a structure 240 such as a liner, casing or open hole in an earth formation borehole, for example, as is employable in hydrocarbon recovery and carbon dioxide sequestration applications. The sealing and anchoring to the structure 240 allows pressure built against a plug seated thereat to build for treatment of the earth formation as is done during fracturing and acid treating, for example. Additionally, the seat 232 is positioned in the system 210 such that pressure applied against a plug seated on the seat 232 urges the seat 232 toward the slips 224 to thereby increase both sealing engagement of the seal 228 with the structure 240 and anchoring engagement of the slips 224 with the structure 240.

The tubular anchoring system 210 can be configured such that the slips 224 are anchored (positionally fixed) to the structure 240 prior to the seal 228 sealingly engaging with the structure 240, or such that the seal 228 is sealingly engaged with the structure 240 prior to the slips 224 anchoring to the structure 240. Controlling which of the seal 228 and the slips 224 engage with the structure first can be through material properties relationships or dimensional relationships between the components involved in the setting of the seal 228 in comparison to the components involved in the setting of the slips 224. Regardless of whether the slips 224 or the seal 228 engages the structure 240 first may be set in response to directions of portions of a setting tool that set the tubular anchoring system 210. Damage to the seal 228 can be minimized by reducing or eliminating relative movement between the seal 228 and the structure 50 after the seal 228 is engaged with the structure 240. In this embodiment, having the seal 228 engage with the structure 240 prior to having the slips 224 engage the structure 240 may achieve this goal. Conversely, in the embodiment of the tubular anchoring system 10, discussed above, having the sleeve 18 engage with the structure 50 before the seal 26 engages with the structure may achieve this goal.

The land 236 of the seat 232 in this embodiment is positioned longitudinally upstream (as defined by fluid flow that urges a plug against the seat 232) of the slips 224. Additionally in this embodiment the land 236 is positioned longitudinally upstream of the seal 228. This relative positioning allows forces generated by pressure against a plug seated against the land 236 to further urge the seal 228 into sealing engagement with the structure 240.

The seat 232 of the embodiment illustrated in the system 210 also includes a collar 244 that is positioned between the seal 228 and the second frustoconical portion 220. The collar 244 illustrated has a wall 248 whose thickness is tapered due to a radially inwardly facing frustoconical surface 252 thereon. The varied thickness of the wall 248 allows for thinner portions to deform more easily than thicker portions. This can be beneficial for at least two reasons. First, the thinner walled portion 249 needs to deform when the collar 244 is moved relative to the second frustoconical portion 220 in order for the seal 228 to be radially expanded into sealing engagement with the structure 240. And second, the thicker walled portion 250 needs to resist deformation due to pressure differential thereacross that is created when pressuring up against a plug seated at the seat 232 during treatment operations, for example. The taper angle of the frustoconical surface 252 may be selected to match a taper angle of the second frustoconical portion 220 to thereby allow the second frustoconical portion 220 to provide radial support to the collar 244 at least in the areas where they are in contact with one another.

Regardless of whether the taper angles match, the portion of the collar 244 that deforms conforms to the second frustoconical portion 220 sufficiently to be radially supported thereby. The taper angles may be in the range of 14 to 20 degrees to facilitate radial expansion of the collar 244 and to allow frictional forces between the collar 244 and the second frustoconical portion 220 to maintain positional relationships therebetween after removal of longitudinal forces that caused the movement therebetween. (The first frustoconical portion 216 may also have taper angles in the range of 14 to 20 degrees for the same reasons that the second frustoconical portion 220 does). Either or both of the frustoconical surface 252 and the second frustoconical portion 220 may include more than one taper angle as is illustrated herein on the second frustoconical portion 220 where a nose 256 has a larger taper angle than the surface 220 has further from the nose 256. Having multiple taper angles can provide operators with greater control over amounts of radial expansion of the collar 244 (and subsequently the seal 228) per unit of longitudinal movement between the collar 244 and the frustoconical member 214. The taper angles, in addition to other variables, also provide additional control over longitudinal forces needed to move the collar 244 relative to the frustoconical member 214. Such control can allow the system 210 to preferentially expand the collar 244 and the seal 228 to set the seal 228 prior to expanding and setting the slips 224. Such a sequence may be desirable since setting the slips 224 before the seal 228 would require the seal 228 to move along the structure 240 after engaging therewith, a condition that could damage the seal 228.

Referring to FIG. 6, another alternate embodiment of a tubular anchoring system disclosed herein is illustrated at 310. The system 310 includes a first frustoconical member 314, slips 318 positioned and configured to be radially expanded into anchoring engagement with a structure 322, illustrated herein as a wellbore in an earth formation 326, in response to be urged against a frustoconical surface 330 of the first frustoconical member 314. A collar 334 is radially expandable into sealing engagement with the structure 322 in response to be urged longitudinally relative to a second frustoconical member 338. And a seat 342 with a surface 346 sealingly receptive to a plug 350 (shown with dashed lines) runnable thereagainst. The seat 342 is displaced in a downstream direction (rightward in FIG. 6) from the collar 334 as defined by fluid that urges the plug 350 against the seat 342. This configuration and position of the surface 346 relative to the collar 334 aids in maintaining the collar 334 in a radially expanded configuration (after having been expanded), by minimizing radial forces on the collar 334 due to pressure differential across the seat 342 when plugged by a plug 350.

To clarify, if the surface 346 were positioned in a direction upstream of even a portion of the longitudinal extend of the collar 334 (which it is not) then pressure built across the plug 350 seated against the surface 346 would generate a pressure differential radially across the portion of the collar 334 positioned in a direction downstream of the surface 346. This pressure differential would be defined by a greater pressure radially outwardly of the collar 334 than radially inwardly of the collar 334, thereby creating radially inwardly forces on the collar 334. These radially inwardly forces, if large enough, could cause the collar 334 to deform radially inwardly potentially compromising the sealing integrity between the collar 334 and the structure 322 in the process. This condition is specifically avoided by the positioning of the surface 346 relative to the collar 334 of the instant invention.

Optionally, the tubular anchoring system 310 includes a seal 354 positioned radially of the collar 334 configured to facilitate sealing of the collar 334 to the structure 322 by being compressed radially therebetween when the collar 334 is radially expanded. The seal 354 maybe fabricated of a polymer to enhance sealing of the seal 354 to both the collar 334 and the structure 322.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A tubular anchoring system comprising
a frustoconical member having a first frustoconical portion and a second frustoconical portion, the first frustoconical portion being tapered in a direction opposing a direction of taper of the second frustoconical portion;
slips in operable communication with the first frustoconical portion being radially expandable in response to longitudinal movement of the first frustoconical portion relative to the slips;
a seal in operable communication with the second frustoconical portion being radially expandable in response to longitudinal movement of the second frustoconical portion relative to the seal; and
a seat having a surface configured to be sealingly engagable with a plug runnable thereagainst sufficient to support pressures built against a seated plug to allow borehole treatment operations.

2. The tubular anchoring system of claim 1, wherein the slips are anchorably engagable with a structure within which the tubular anchoring system is positionable.

3. The tubular anchoring system of claim 1, wherein the seal is sealingly engagable with a structure within which the tubular anchoring system is positionable.

4. The tubular anchoring system of claim 1, wherein the seat is configured to urge both the slips and the seal radially outwardly in response to pressure against a plug seated thereagainst.

5. The tubular anchoring system of claim 1, wherein at least one of the first frustoconical portion and the second frustoconical portion has a frustoconical angle of taper between 14 and 20 degrees.

6. The tubular anchoring system of claim 1, wherein the seal is configured to radially expand into sealing engagement with a structure at longitudinal loads that are less than those needed to expand the slips into anchorable engagement with the structure.

7. The tubular anchoring system of claim 1, wherein frictional engagement between the slips and the first frustoconical portion prevent reversal of movement therebetween after the slips have been radially expanded by the first frustoconical portion.

8. The tubular anchoring system of claim 1, wherein the second frustoconical portion includes two different angles of taper.

9. A tubular anchoring system comprising:
a frustoconical member having a first frustoconical portion and a second frustoconical portion, the first frustoconical portion being tapered in a direction opposing a direction of taper of the second frustoconical portion;
slips in operable communication with the first frustoconical portion being radially expandable in response to longitudinal movement of the first frustoconical portion relative to the slips;
a seal in operable communication with the second frustoconical portion being radially expandable in response to longitudinal movement of the second frustoconical portion relative to the seal; and
a seal having a surface configured to be sealingly engagable with a plug runnable thereagainst, the seat having a collar of which at least a portion is radially expandable upon movement relative to the frustoconical member.

10. The tubular anchoring system of claim 9, wherein the seal is positioned radially of the collar.

11. The tubular anchoring system of claim 9, wherein the collar is configured to support pressure differentials across a wall and the pressure differentials are sufficient to perform borehole treatment operations.

12. The tubular anchoring system of claim 9, wherein the collar includes a frustoconical surface that is engagable with the second frustoconical portion.

13. The tubular anchoring system of claim 9, wherein the collar includes a deformable portion configured to substantially conform to at least a portion of the second frustoconical portion contactable therewith.

14. The tubular anchoring system of claim 9, wherein frictional engagement between the second frustoconical portion and the collar prevents reversal of movement therebetween after the collar has been radially expanded by the second frustoconical portion.

15. A method of anchoring a tubular member, comprising:
compressing a tubular member positioned within a structure;
moving slips in a first longitudinal direction relative to a frustoconical member with the compressing;
ramping the slips radially outwardly along a first frustoconical portion of the frustoconical member;
moving a seal in a second longitudinal direction relative to the frustoconical member with the compressing;
ramping the seal radially outwardly along a second frustoconical portion of the frustoconical member;
sealing the seal to the structure;
anchoring the slips to the structure;
seating a plug against a seat;
pressuring up against the seated plug; and
treating an earth formation.

16. The method of anchoring a tubular member, of claim 15, further comprising sealing the seal prior to anchoring the slips.

17. The method of anchoring a tubular member, of claim 15, further comprising radially expanding at least a portion of the seat.

18. The method of anchoring a tubular member, of claim 17, further comprising radially expanding the seal with the radial expanding of the at least a portion of the seat.

* * * * *